US012657759B2

(12) United States Patent
Mintgen

(10) Patent No.: US 12,657,759 B2
(45) Date of Patent: Jun. 16, 2026

(54) USAGE OF MACHINE LEARNING FOR AUTOMATIC DETERMINATION OF TURBINE LOCATIONS FROM IMAGES

(71) Applicant: VESTAS WIND SYSTEMS A/S, Aarhus N. (DK)

(72) Inventor: Goran Florian Mintgen, Oporto (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 785 days.

(21) Appl. No.: 17/722,133

(22) Filed: Apr. 15, 2022

(65) Prior Publication Data

US 2022/0335645 A1      Oct. 20, 2022

(30) Foreign Application Priority Data

Apr. 20, 2021     (EP) ..................................... 21169330

(51) Int. Cl.
*G06F 16/29*          (2019.01)
*F03D 17/00*          (2016.01)
              (Continued)

(52) U.S. Cl.
CPC ................ *G06T 7/73* (2017.01); *G06V 10/70* (2022.01); *G06V 20/13* (2022.01); *G06V 20/176* (2022.01);
              (Continued)

(58) Field of Classification Search
CPC ............. G06T 7/73; G06T 2207/10032; G06T 2207/20081; G06T 2207/30184; G06V 10/70; G06V 20/13; G06V 20/176; F05B 2260/80; F05B 2260/84; F05B 2270/8041; G06F 16/29; G06N 3/044; G06N 3/045; G06N 3/08; F03D 17/00
See application file for complete search history.

(56)                References Cited

U.S. PATENT DOCUMENTS

2018/0336408 A1*  11/2018  Arya ....................... F03D 17/00
2020/0226371 A1     7/2020  Adler

FOREIGN PATENT DOCUMENTS

WO        WO-2019103621 A1 *  5/2019  ............. F03D 17/00

OTHER PUBLICATIONS

European Patent Office, Extended European Search Report for Application 21169330.4-1007 dated Sep. 27, 2021.
(Continued)

*Primary Examiner* — Vu Le
*Assistant Examiner* — Lei Zhao
(74) *Attorney, Agent, or Firm* — Patterson + Sheridan, LLP; Gero G. McClellan

(57)                ABSTRACT
Techniques for identifying a geographic location of a wind turbine using an image. An image depicting a geographic area is received. A location is identified, in the image, relating to a place where a wind turbine tower depicted in the image meets ground depicted in the image. This includes identifying two objects relating to the wind turbine tower in the image, and distinguishing a bottom end of the wind turbine tower from a top end of the wind turbine tower based on the identified two objects. A geographic location corresponding to the determined image location is determined, based on the image and the determined image location. A location of the wind turbine tower, in a database of wind turbine locations, is updated based on the geographic location.

15 Claims, 6 Drawing Sheets

(51) Int. Cl.
| | |
|---|---|
| *G06N 3/044* | (2023.01) |
| *G06N 3/045* | (2023.01) |
| *G06N 3/08* | (2023.01) |
| *G06T 7/73* | (2017.01) |
| *G06V 10/70* | (2022.01) |
| *G06V 20/10* | (2022.01) |
| *G06V 20/13* | (2022.01) |

(52) U.S. Cl.
CPC ............... *G06T 2207/10032* (2013.01); *G06T 2207/20081* (2013.01); *G06T 2207/30184* (2013.01)

(56)                                     References Cited

OTHER PUBLICATIONS

Manso-Callejo Miguel-Angel et al., "Optimizing the Recognition and Feature Extraction of Wind Turbines through Hybrid Semantic Segmentation Architectures," Remote Sensing, vol. 12, No. 22, dated Nov. 13, 2020 p. 3743.

Daniel Moraite, "Jul. 9, 2021 Wind Turbines in Satellite Imagery, by Daniel Moraite, DataSeries, Medium Wind Turbines in Satellite Imagery," dated Mar. 26, 2020, URL:https://medium.com/dataseries/wind-turbbines-in-satellite-imagery-dac1304a473d.

Office Action received for European Patent Application No. 21169330.4, mailed on Feb. 12, 2025, 6 pages.

* cited by examiner

SYSTEM  200

PROCESSOR                                    202

MEMORY                                    210

ML TRAINING SERVICE              212

ML INTERFERENCE SERVICE  214

ML MODEL  216

NETWORK COMPONENTS          220

USAGE OF MACHINE LEARNING FOR AUTOMATIC DETERMINATION OF TURBINE LOCATIONS FROM IMAGES

BACKGROUND

Field of the Invention

Embodiments presented in this disclosure generally relate to wind turbines and machine learning. More specifically, one or more embodiments disclosed herein relate to identification of wind turbine location from images using machine learning.

Description of the Related Art

Determining the geographic location of individual wind turbines, for example in a large installation of wind turbines, can be challenging. Wind turbine operators may maintain a database of geographic locations for wind turbines in an installation, but such databases are prone to errors. For example, individual wind turbines may be associated with incorrect coordinates (e.g., latitude and longitude) or with no coordinates at all.

Verifying, or determining, the geographic locations for wind turbines can be a time consuming and expensive process. For example, an operator could manually identify the locations of wind turbines by viewing satellite images. As another example, an operator could manually mark the shapes of wind turbines as geo-referenced polygons in a geographic information system (GIS) tool. But these techniques require manual intervention from an operator, and are inefficient and time consuming.

SUMMARY

Embodiments include a method. The method includes receiving an image depicting a geographic area. The method further includes determining an image location, in the image, corresponding to a place where a wind turbine tower depicted in the image meets ground depicted in the image. This includes identifying a first object relating to the wind turbine tower in the image, wherein the first object includes at least one of the wind turbine tower or a shadow of the wind turbine tower, identifying a second object relating to the wind turbine tower in the image, wherein the second object includes at least one of a component of the wind turbine tower or a shadow relating to the wind turbine tower, and distinguishing a bottom end of the wind turbine tower from a top end of the wind turbine tower based on the identified first and second objects. The method further includes determining, based on the image and the determined image location, a geographic location corresponding to the determined image location. The method further includes updating a location of the wind turbine tower in a database of wind turbine locations based on the geographic location.

According to one or more embodiments, identifying the image location in the image, according to the method, further includes identifying the wind turbine tower in the image using a machine learning (ML) model, wherein the first object includes the wind turbine tower. It further includes identifying the shadow of the wind turbine tower in the image using the ML model, wherein the second object includes the shadow of the wind turbine tower. It further includes distinguishing the bottom end of the wind turbine tower from the top end of the wind turbine tower based on identifying a location in the image where the identified wind turbine tower intersects the identified shadow.

According to one or more embodiments, identifying the image location in the image, according to the method, further includes identifying the first object in the image using an ML model. It further includes identifying the second object in the image using the ML model, the second object including at least one of: (i) a rotor relating to the wind turbine tower, (ii) a nacelle relating to the wind turbine tower, (iii) a rotor shadow relating to the wind turbine tower, or (iv) a nacelle shadow relating to the wind turbine tower. It further includes distinguishing the bottom end of the wind turbine tower from the top end of the wind turbine tower based on identifying an end of the first object that is further from the second object than an opposite end of the first object.

According to one or more embodiments, identifying the image location in the image, according to the method, further includes identifying the wind turbine tower in the image using an ML model, wherein the first object includes the wind turbine tower. It further includes identifying a shadow of the wind turbine tower depicted in the image using the ML model. It further includes identifying the second object in the image using the ML model, the second object including at least one of: (i) a rotor relating to the wind turbine tower, (ii) a nacelle relating to the wind turbine tower, (iii) a rotor shadow relating to the wind turbine tower, or (iv) a nacelle shadow relating to the wind turbine tower. It further includes distinguishing the bottom end of the wind turbine tower from the top end of the wind turbine tower based on: identifying a location in the image where the identified wind turbine tower intersects the identified shadow, and identifying an end of the wind turbine tower or shadow that is further from the second object than an opposite end of the wind turbine tower or shadow.

According to one or more embodiments, the determined geographic location, according to the method, includes at least one of: (i) a latitude and a longitude, or (ii) easting and northing for a projection.

According to one or more embodiments, the determined geographic location, according to the method, is based on metadata for the image relating to the geographic area depicted in the image.

According to one or more embodiments, updating the location of the wind turbine tower in the database of wind turbine locations, according to the method, further includes determining that the database does not include any entry recording the determined geographic location. It further includes identifying an entry in the database based on proximity of a location recorded in the entry to the determined geographic location. It further includes updating the entry to record the determined geographic location.

According to one or more embodiments, identifying the entry in the database, according to the method, further includes identifying the entry in the database that records a location geographically closest to the determined geographic location.

According to one or more embodiments, the ML model, according to the method, is trained using data from the database of wind turbine locations.

According to one or more embodiments the method further includes receiving a second image depicting a second geographic area. The method further includes failing to recognize a second wind turbine tower using the ML model. The method further includes retrieving a third image depicting a third geographic area relating to the second geographic area. The method further includes identifying, using the ML model and based on the third image, a second image location, in the third image, relating to a second place where the second wind turbine tower depicted in the third image meets ground depicted in the third image. The method further includes determining, based on the third image and the second image location, a second geographic location corresponding to the second image location. The method further includes updating a second location of the second wind turbine tower in the database of wind turbine locations, based on the determined second geographic location.

Embodiments further include a system. The system includes a processor and a memory storing a program, which, when executed on the processor, performs an operation. The operation includes receiving an image depicting a geographic area. The operation further includes determining an image location, in the image, corresponding to a place where a wind turbine tower depicted in the image meets ground depicted in the image. This includes identifying a first object relating to the wind turbine tower in the image, wherein the first object includes at least one of the wind turbine tower or a shadow of the wind turbine tower, identifying a second object relating to the wind turbine tower in the image, wherein the second object includes at least one of a component of the wind turbine tower or a shadow relating to the wind turbine tower, and distinguishing a bottom end of the wind turbine tower from a top end of the wind turbine tower based on the identified first and second objects. The operation further includes determining, based on the image and the determined image location, a geographic location corresponding to the determined image location. The operation further includes updating a location of the wind turbine tower in a database of wind turbine locations based on the geographic location.

According to one or more embodiments, identifying the image location in the image, according to the operation, further includes identifying the wind turbine tower in the image using a machine learning (ML) model, wherein the first object includes the wind turbine tower. It further includes identifying the shadow of the wind turbine tower in the image using the ML model, wherein the second object includes the shadow of the wind turbine tower. It further includes distinguishing the bottom end of the wind turbine tower from the top end of the wind turbine tower based on identifying a location in the image where the identified wind turbine tower intersects the identified shadow.

According to one or more embodiments, updating the location of the wind turbine tower in the database of wind turbine locations, according to the operation, further includes determining that the database does not include any entry recording the determined geographic location. It further includes identifying an entry in the database that records a location geographically closest to the determined geographic location. It further includes modifying the entry to record the determined geographic location.

According to one or more embodiments, the operation further includes receiving a second image depicting a second geographic area. The operation further includes failing to recognize a second wind turbine tower and a second shadow of the second wind turbine tower, using the ML model. The operation further includes retrieving a third image depicting a third geographic area relating to the second geographic area. The operation further includes identifying, using the ML model and based on the third image, a second image location, in the third image, relating to a second place where the second wind turbine tower depicted in the third image meets ground depicted in the third image. The operation further includes determining, based on the third image and the second image location, a second geographic location corresponding to the second image location. The operation further includes updating a second location of the second wind turbine tower in the database of wind turbine locations, based on the determined second geographic location.

Embodiments further include a computer program product. The computer program product includes a non-transitory computer-readable storage medium having computer-readable program code embodied therewith, the computer-readable program code executable by one or more computer processors to perform an operation. The operation includes receiving an image depicting a geographic area. The operation further includes determining an image location, in the image, corresponding to a place where a wind turbine tower depicted in the image meets ground depicted in the image. This includes identifying a first object relating to the wind turbine tower in the image, wherein the first object includes at least one of the wind turbine tower or a shadow of the wind turbine tower, identifying a second object relating to the wind turbine tower in the image, wherein the second object includes at least one of a component of the wind turbine tower or a shadow relating to the wind turbine tower, and distinguishing a bottom end of the wind turbine tower from a top end of the wind turbine tower based on the identified first and second objects. The operation further includes determining, based on the image and the determined image location, a geographic location corresponding to the determined image location. The operation further includes updating a location of the wind turbine tower in a database of wind turbine locations based on the geographic location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

In an embodiment, the locations of window turbines can be determined using machine learning (ML) to recognize geographic locations in images (e.g., in satellite images). For example, satellite images of turbine installation areas can be maintained in a repository (e.g., a third party commercial repository). An existing database of unverified, or partially verified, wind turbine locations can be used to identify expected geographic locations for wind turbines in an installation. Images (e.g., satellite images) for these expected geographic locations can be retrieved from the repository.

In an embodiment, it can be assumed most entries in the database of wind turbine locations are correct, or nearly correct. Thus, the images retrieved from the repository will, in most instances, include the wind turbine. An ML model can be trained to use image recognition (e.g., object detection) techniques to identify the wind turbine in the images, and to determine the geographic location of the wind turbine (e.g., latitude and longitude) recognized in the image. For example, the ML model can identify the location where the wind turbine meets the ground (e.g., where the wind turbine intersects its shadow). This intersection can be identified as the location of the wind turbine, and can be used to verify, or correct, the database of wind turbine locations.

In an embodiment, however, the wind turbine location database may be inaccurate. For example, prior to updating the wind turbine location database may include missing, or inaccurate, location information for some wind turbines. The ML model can be configured, and trained, to address this. For example, in one scenario, a wind turbine database can include incorrect geographic location data for a wind turbine. The ML model can use image recognition (e.g., object detection) techniques to identify the wind turbine that is closest to the expected location, and can update the database with the location of this identified turbine (e.g., the location where the turbine meets the ground). In another scenario, the wind turbine location database may be missing location data for a given wind turbine, or wind turbine installation. The ML model can be provided with an expected location for the missing wind turbine(s), and can use image recognition techniques to identify wind turbines at the missing location.

EXAMPLE EMBODIMENTS

Figure 1A:
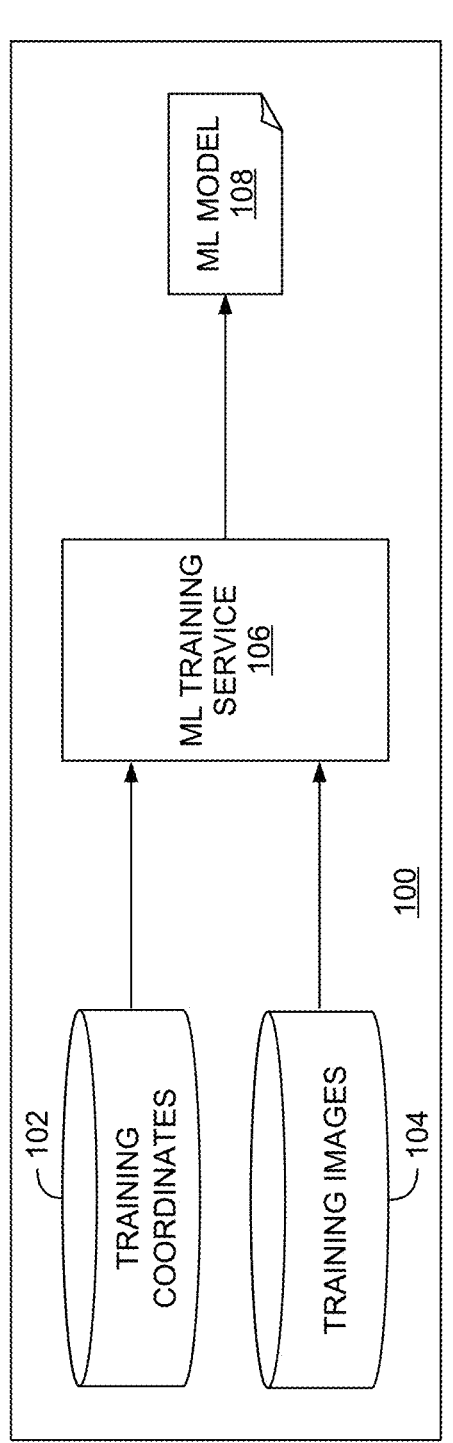
FIG. 1A illustrates updating wind turbine location from images using machine learning, according to an embodiment described in this present disclosure.

FIG. 1A illustrates updating wind turbine location from images using ML, according to an embodiment described in this present disclosure. A block 100 illustrates training an ML model 108. In an embodiment, training coordinates 102 and a repository of training images 104 are provided to an ML training service 106. The ML training service 106 uses the training coordinates 102 and training images 104 to train an ML model, and generates a trained ML model 108. This is discussed further with regard to FIG. 3, below.

In an embodiment, the training coordinates 102 are wind turbine coordinates selected from an existing database of wind turbine coordinates and the training images 104 are satellite images corresponding to the training coordinates 102. If the existing database is assumed to be sufficiently accurate, it can be used directly by the ML training service 106 to train the ML model 108. Further, in an embodiment, the training images 104 can be selected to include the wind turbine at a known location in the image (e.g., at the center of the image). For example, the training images 104 can be selected based on the training coordinates 102, from a repository of images, such that each training coordinate is a center of a corresponding image. In this example, no manual intervention or manually created training data is required.

As another example, the training images 104 can include a feature of the wind turbine at the known location in the image (e.g., at the center). For example, the training images 104 can depict a location where a shadow of a wind turbine tower meets the wind turbine tower at the center of the image, or at another known location in the image. The ML training service 106 can use these training images 104, along with corresponding training coordinates (e.g., reflecting the geographic location of the wind turbine), to train the ML model 108 to determine the location of the wind turbine based on the identified wind turbine feature. For example, as discussed further below with regard to FIG. 3, the ML training service 106 can train the ML model 108 to use image segmentation techniques to identify the wind turbine tower and the wind turbine tower shadow, and to distinguish the top of the wind turbine tower from the bottom of the wind turbine tower based on the identified wind turbine tower and its shadow, using the training images 104 in which features of the wind turbine (e.g., the location where the wind turbine tower meets its shadow) are located at known locations in the image (e.g., at the center).

The location where the shadow of the wind turbine tower meets the tower is merely one example, and the training images can include any suitable wind turbine feature (e.g., a nacelle, a rotor (e.g., including blades), a shadow of the nacelle or rotor, or an end of the wind turbine opposite the nacelle). Use of these wind turbine features to determine the wind turbine location is discussed further below with regard to FIG. 5. In an embodiment, the ML training service 106 further trains the ML model 108 to use image segmentation techniques to identify these wind turbine features and to use them distinguish the top of the wind turbine tower from the bottom of the wind turbine tower, using the training images 104.

Alternatively, or in addition, the training coordinates 102 can be manually verified (e.g., to ensure accuracy, or where no existing database of wind turbine locations exists). Further, the training images 104 can be manually selected, or manually manipulated to place the relevant turbine feature at the center of the image (e.g., by cropping the image). As another example, the training images 104 can be labeled with various objects depicted in the images, including the wind turbine tower, the shadow of the wind turbine tower, or wind turbine features (e.g., a nacelle, a rotor (e.g., including blades), a shadow of the nacelle or rotor, or an end of the wind turbine opposite the nacelle). As discussed further below with regard to FIG. 3, the ML training service 106 can use the labeled data to train the ML model 108 to identify the labeled objects in images (e.g., using image segmentation techniques).

A block 110 illustrates inference using the ML model 108. In an embodiment, a turbine coordinate database 112 is an existing database of wind turbine locations. The turbine coordinate database 112 is used to select images from an image repository 114 to provide to an ML inference service 116. For example, the image repository 114 can include satellite images covering a large geographic area (e.g., a continent, a portion of a continent, the entire earth, etc.), and a portion of these images can be selected and provided to the ML inference service 116.

The turbine coordinate database 112 can be used to select images from the image repository 114. In an embodiment, an image depicting each set of coordinates in the turbine coordinate database is selected and provided to the ML inference service 116. Further, images depicting areas nearby to the expected locations can be provided to the ML inference service 116.

In an embodiment, the ML inference service 116 provides the expected (e.g., unverified) turbine coordinates from the turbine coordinate database 112, along with the images selected from the image repository 114, to the ML model 108. The ML model 108 then uses image recognition (e.g., object detection) techniques to identify the geographic location of the wind turbine. For example, the ML model 108 can use image recognition to identify the pixel location where a wind turbine meets the ground (e.g., where the wind turbine intersects its shadow). The ML model 108 can further use metadata associated with a given image (e.g., metadata describing the image size and the geographic area depicted in the image) to determine the geographic location (e.g., latitude and longitude) corresponding to the pixel location in the image. The ML model 108 can then generate an ML inference output 118 (e.g., locations of identified wind turbines in the images from the image repository 114). The ML inference service 116 can use the ML inference output to update a wind turbine location database 120. This is discussed further below, with regard to FIGS. 4 and 5.

Figure 1A:
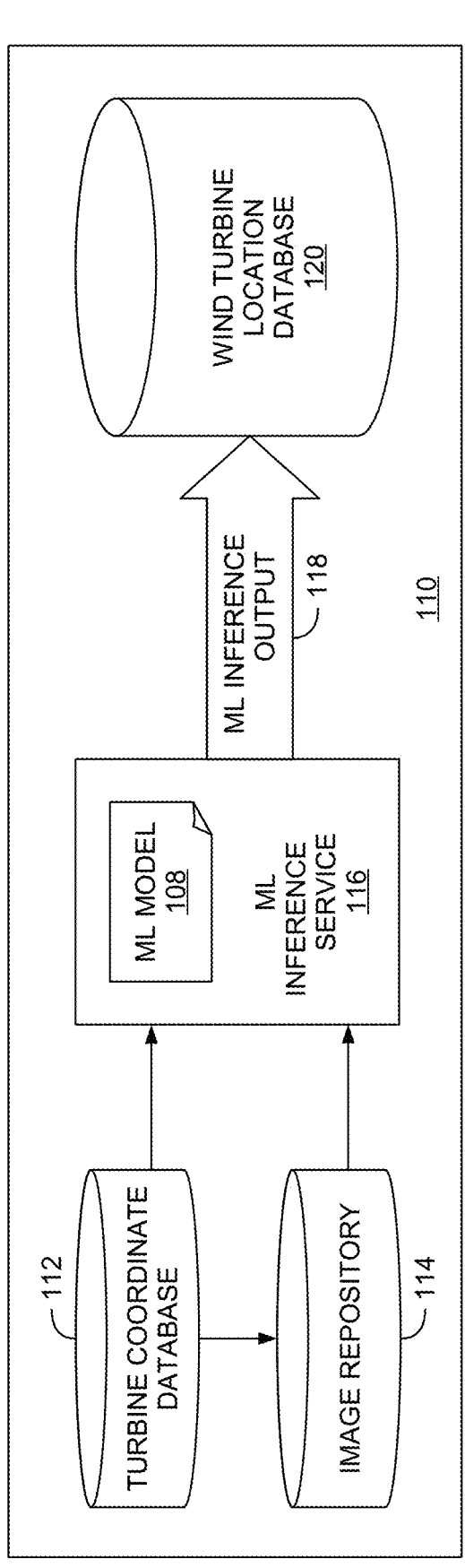
Figure 1B:
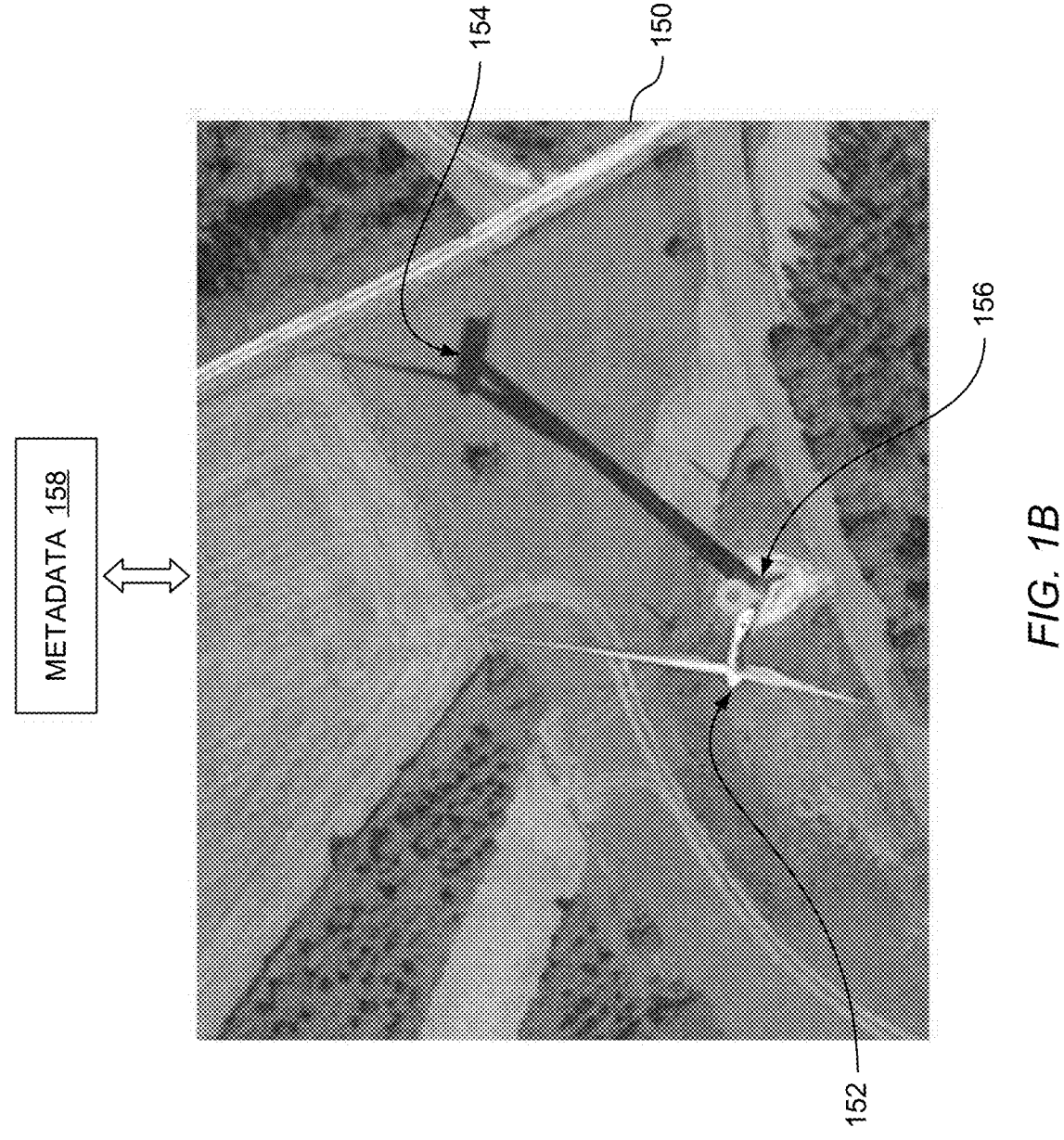
FIG. 1B illustrates a location of a wind turbine in an image, according to an embodiment described in this present disclosure.

FIG. 1B illustrates a location of a wind turbine in an image, according to an embodiment described in this present disclosure. An image 150 is, for example, a satellite image depicting a wind turbine 152 and its shadow 154. In an embodiment, the image 150 is included in a repository of satellite images. Further, in an embodiment, the images in the repository are captured during clear days so that shadows are visible. The shadow 154 intersects the tower of the wind turbine 152 at the point 156. As discussed above, in an embodiment an ML model can be trained to use image recognition techniques to identify the point 156 (e.g., a pixel location) where the shadow 154 intersects the tower of the wind turbine 152 (e.g., the location where the wind turbine 152 meets the ground).

Further, in an embodiment, the image 150 includes associated metadata 158. For example, the metadata 158 can include a geographic location covered by the image (e.g., latitude and longitude), a size of the image, a location of the image capture device (e.g., a location of the satellite), a time and date at which the image was captured, data describing the capture device, and other data. As discussed further below, an ML model can use this metadata 158 to identify the geographic location (e.g., latitude and longitude) of the point 156, and to improve image recognition.

Figure 2:
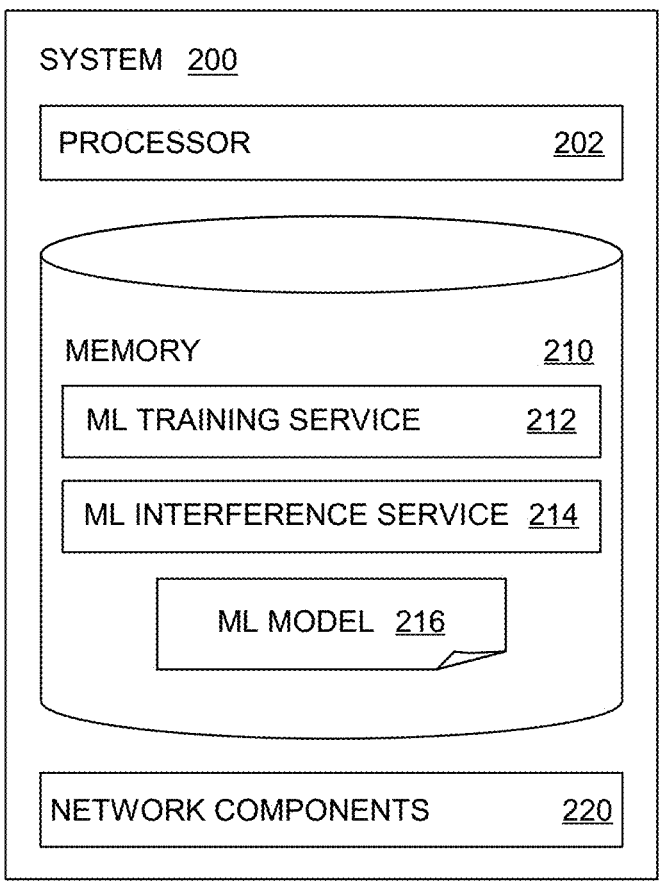
FIG. 2 is a block diagram illustrating a system for determining wind turbine location, according to an embodiment described in this present disclosure.

FIG. 2 is a block diagram illustrating a system 200 for determining wind turbine location, according to an embodiment described in this present disclosure. The system 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the system 200 to interface with a communication network (e.g., any suitable wired or wireless communication network). For example, the network components 220 can include WiFi or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the system 200. The program code is generally described as various functional "applications" or "modules" within the memory 210, although alternate implementations may have different functions and/or combinations of functions. Within the memory 210, an ML training service 212 manages training of an ML model (e.g., the ML model 108 illustrated in FIG. 1) for geographic location of wind turbines. This is discussed further with regard to FIG. 3, below. An ML inference service 214 uses the ML model 216 to determine geographic location of wind turbines (e.g., the ML model 108 illustrated in FIG. 1). In an embodiment, the ML inference service 214 both uses the ML model 216 for inference, and performs additional processing and analysis (e.g., without using the ML model 216). This is discussed further with regard to FIGS. 4-5, below.

Figure 3:
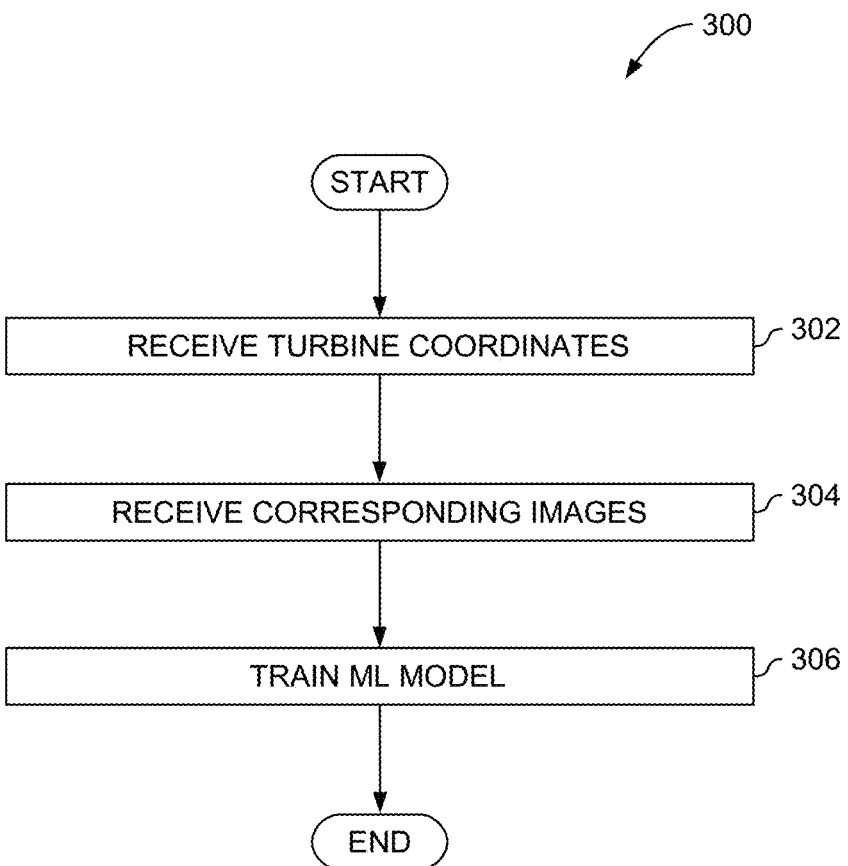
FIG. 3 is a flowchart illustrating training a machine learning model for updating wind turbine location from images, according to an embodiment described in this present disclosure.

FIG. 3 is a flowchart 300 illustrating training an ML model for updating wind turbine location from images, according to an embodiment described in this present disclosure. At block 302 an ML training service (e.g., the ML training service 212 illustrated in FIG. 2) receives turbine coordinates. At block 304, the ML training service receives images (e.g., satellite images) depicting areas corresponding to the received turbine coordinates. In an embodiment, the received images can be in the visible light spectrum with a sufficiently high resolution to identify a wind turbine in the image. Alternatively, infrared images could be used, or images in any suitable light spectrum.

Further, in an embodiment the wind turbines (e.g., including wind turbine features as discussed above with regard to FIG. 1) depicted in the images received at block 304 have a similar shape to wind turbines in images used for inference. Many, but not all, wind turbines include cylindrically shaped vertical towers. Training the ML model with images depicting wind turbines, and wind turbine features, with the same tower shape as the wind turbines used in inference improves accuracy of image recognition for both the wind turbine and its shadow (e.g., as discussed below with regard to FIG. 5).

At block 306, the ML training service trains the ML model using the received turbine coordinates and corresponding images. In an embodiment, the flowchart 300 illustrates "trained" or "supervised" ML, in which exemplars and pre-determined attribute scores are used to train an ML model (e.g., the ML model 216 illustrated in FIG. 2). A corpus of training data can, in an embodiment, be converted into feature vectors. These feature vectors are provided to a model training component (e.g., the ML training service 212 illustrated in FIG. 2), along with a set of associated attribute values.

In an embodiment, at block 306 the ML training service uses the turbine coordinates and corresponding images to train the ML model to recognize a wind turbine, or wind turbine feature, in a given image (e.g., a satellite image) and determine the geographic location (e.g., latitude and longitude) of the wind turbine. For example, as discussed above, the ML model can be trained to identify a pixel location where a wind turbine meets the ground (e.g., where the wind turbine intersects its shadow), and designate the geographic location corresponding with that pixel location as the geographic location of the wind turbine. The location where a wind turbine meets the ground is merely one example, and any suitable wind turbine feature can be used (e.g., a nacelle, a rotor (e.g., including blades), a shadow of the nacelle or rotor, or an end of the wind turbine opposite the nacelle).

The geographic location can be identified using any suitable technique. For example, latitude and longitude can be used. As another example, easting and northing for a projection can be used. A projection can be specified (e.g., using a universal transverse mercator (UTM) zone and number) and easting and northing for that projection can be used to identify the geographic location.

Any suitable ML model configuration can be used for this image recognition. For example, a deep learning neural network (DNN) configured for computer vision (e.g., image segmentation) could be used, including a convolutional neural network (CNN), a fully convolutional network (FCN) (e.g., U-Net), a region-based CNN (R-CNN) (e.g., Fast R-CNN or Faster R-CNN) or a recurrent neural network (RNN). These are merely examples, and any suitable ML model configuration can be used (e.g., a You Only Look Once (YOLO) model). The ML model can further be trained to correlate an image location (e.g., a pixel location) with a geographic location (e.g., using metadata relating to the image), and to identify the geographic location of the wind turbine.

In an embodiment, the turbine coordinates received at block 302 and the corresponding images received at block 304 are generated automatically without manually creating training data. For example, as discussed above, the turbine coordinates can be selected from an existing database of wind turbine coordinates, and the corresponding images can be satellite images corresponding to the turbine coordinates, selected from a repository of satellite images. The existing database can, for example, include a large number of entries, the vast majority of which are accurate. Thus, the existing database can be assumed to be sufficiently accurate to allow use of data from the database in training the ML model.

In an embodiment, the ML training service (or another suitable service) can select the corresponding images, received at block 304, to include the wind turbine at a known location in the image (e.g., at the center of the image). For example, the ML training service can provide the turbine coordinates received at block 302 to a repository of satellite images, and the repository can provide images corresponding to each set of coordinates (e.g., latitude and longitude), with the specified coordinates at the center of the image. At block 306 the ML training service can then train the ML model to recognize wind turbines in images, by assuming each image includes a wind turbine at the center of the image.

As one example, the ML training service can train the ML model to distinguish the bottom of a wind turbine tower from the top of the wind turbine tower, using the known location of the bottom of the wind turbine tower in the images received at block 304. In an embodiment, the ML model uses image segmentation techniques to identify objects in the image (e.g., the wind turbine tower, the shadow of the wind turbine tower, or any suitable wind turbine feature). The ML training service can train the ML model to use these identified objects to distinguish the bottom of the wind turbine tower from the top of the wind turbine tower, based on the assumption that the images received at block 304 depict the wind turbine tower meeting the ground at the known location in the image (e.g., at the center of the image). For example, the ML model can be trained to identify the wind turbine tower and the shadow of the wind turbine tower, and to recognize that the location where the wind turbine tower meets its shadow is the location where the wind turbine tower meets the ground (e.g., the bottom of the wind turbine tower). As another example the ML model can be trained to identify the end of the wind turbine tower furthest from other wind turbine objects (e.g., furthest from the nacelle or rotor) as the location where the wind turbine tower meets the ground (e.g., the bottom of the wind turbine tower). This is discussed further with regard to FIG. 5, below.

Alternatively, or in addition, the training data can be manually updated (e.g., created or verified (in whole or in part)). For example, the turbine coordinates received at block 302 could be manually updated to ensure that the coordinates accurately correspond to a geographic location of a wind turbine. As another example, the corresponding images received at block 304 could be manually selected, or manually manipulated, to place a wind turbine at the center of each image. As another example, the images received at block 304 could be labeled with any number of suitable objects, including the wind turbine tower, the shadow of the wind turbine tower, or wind turbine features (e.g., a nacelle, a rotor (e.g., including blades), a shadow of the nacelle or rotor, or an end of the wind turbine opposite the nacelle). The ML training service could train the ML model (e.g., using image segmentation techniques), using these labeled images, to identify the objects and to use these objects to recognize the location where the wind turbine tower meets the ground (e.g., the bottom of the wind turbine tower).

Further, in an embodiment, a combination of manually created and automatically crated training data could be used. This could be used, for example, where an existing database of wind turbine locations is not known to be sufficiently accurate to train an ML model. For example, manually created training data could be used to initially train the ML model for a relatively small sample of wind turbines. This partially trained ML model could then be used to verify geographic location for a somewhat larger, but still not complete, sample of wind turbines (e.g., a wind turbine installation or a small group of wind turbine installations), and to update an existing database of wind turbine locations. This partially updated database could then be used to provide automated training data and further train the ML model. This can ensure that the ML model is initially trained using verified, accurate data, and the initially trained ML model can be used to improve the accuracy of automatically created training data.

In an embodiment, additional data can be used to enhance the ML model. For example, the images received at block 304 can include metadata (e.g., metadata 158 illustrated in FIG. 1B), reflecting a date and time at which the image was captured. The ML model can be trained to use this date and time to calculate an expected location of the sun at the given date and time, and therefore an expected direction of a shadow for a wind turbine tower (e.g., assuming the wind turbine tower is erected vertically). This expected direction of the shadow can be used to improve the accuracy of image recognition of the wind turbine and its shadow.

Figure 4:
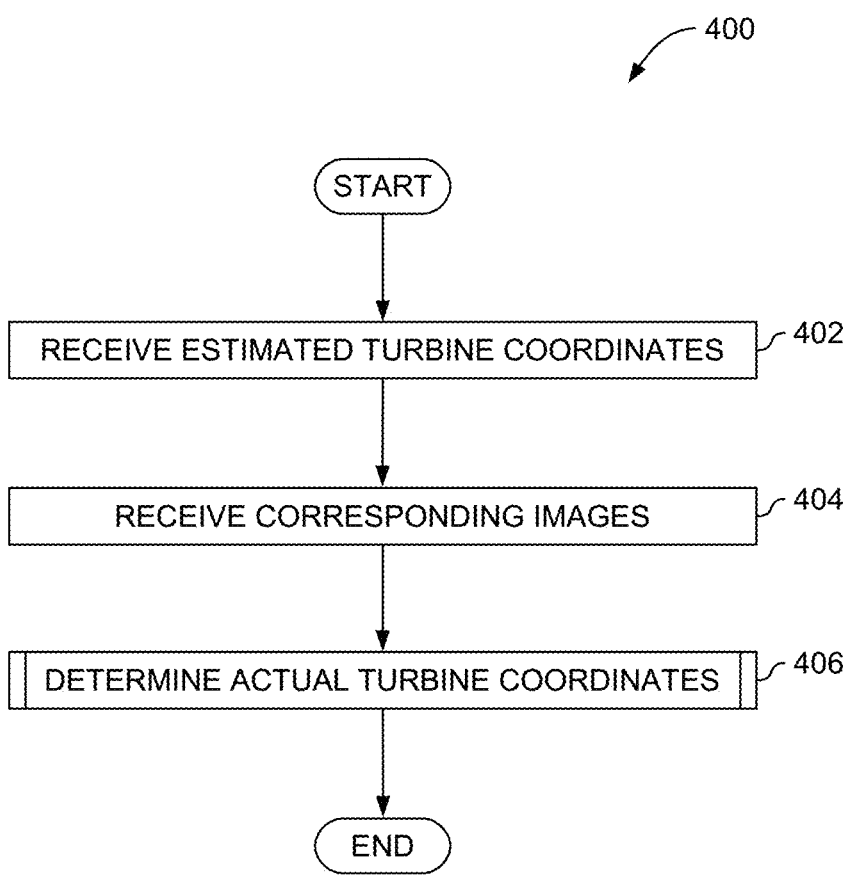
FIG. 4 is a flowchart illustrating determining wind turbine location from images using machine learning, according to an embodiment described in this present disclosure.

FIG. 4 is a flowchart 400 illustrating determining wind turbine location from images using ML, according to an embodiment described in this present disclosure. At block 402 an ML inference service (e.g., the ML inference service 214 illustrated in FIG. 2) receives estimated turbine coordinates. For example, these estimated coordinates can be from an existing database of wind turbine coordinates.

At block 404, the ML inference service receives corresponding images. In an embodiment, the corresponding images are satellite images selected from an existing repository of satellite images to depict the areas defined by the coordinates received at block 402. This is merely one example, and other suitable images can be used.

Further, the ML inference service can be provided with images that do not correspond to an estimated wind turbine location. For example, a given wind turbine installation may not be included in a database of wind turbine locations (e.g., the wind turbine installation may be newly constructed, may have been purchased from another entity, the database could have an error, etc.). The ML inference service can be provided with images depicting an area that is expected to include one or more wind turbines: for example, images depicting the expected boundaries of a wind turbine installation. The techniques discussed below in relation to block 406 and FIG. 5 can then be used to identify the wind turbines depicted in the images.

At block 406, the ML inference service determines the actual turbine coordinates. For example, the ML inference service can use image recognition techniques to identify a location of a wind turbine in an image (e.g., a point at which the wind turbine meets its shadow), and can use metadata associated with the image to determine the geographic location (e.g., latitude and longitude) of the image location. This is discussed further with regard to FIG. 5, below.

Figure 5:
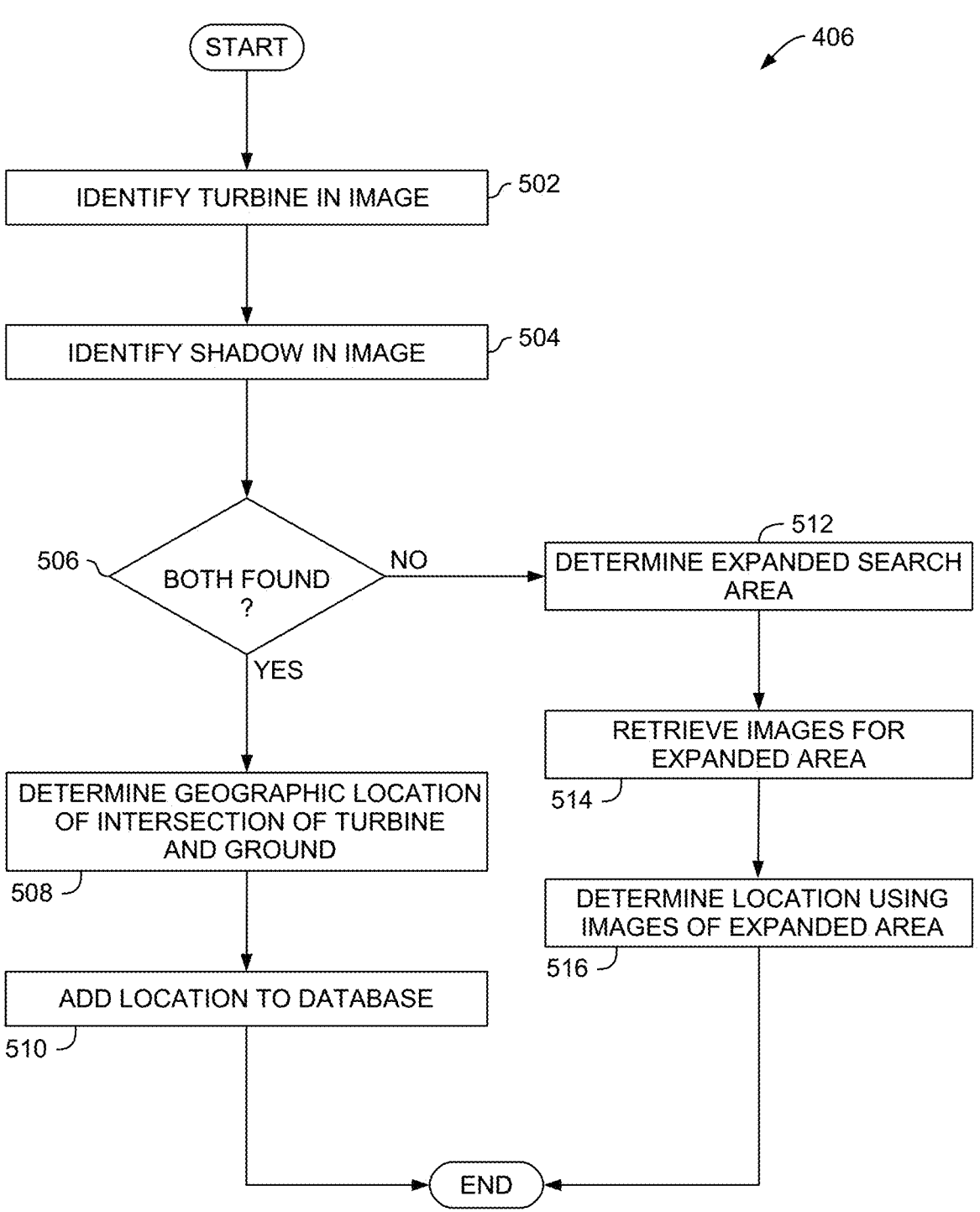
FIG. 5 is a flowchart further illustrating determining wind turbine location from images using machine learning, according to an embodiment described in this present disclosure.

FIG. 5 is a flowchart further illustrating determining wind turbine location from images using ML, according to an embodiment described in this present disclosure. In an embodiment, FIG. 5 corresponds with block 406 illustrated in FIG. 4. At block 502, an ML inference service (e.g., the ML inference service 214 illustrated in FIG. 2) identifies a wind turbine in a given image (e.g., an image received at block 404 illustrated in FIG. 4). In an embodiment, the ML inference service identifies the wind turbine tower in the image. Alternatively, or in addition, the ML inference service identifies additional components of the wind turbine, including the nacelle, the rotor (e.g., including blades), and any other suitable components. As discussed above, the ML inference service can use any suitable image recognition or computer vision technique to identify the wind turbine (e.g., a CNN, an RNN, etc.).

At block 504, the ML inference service identifies a shadow of the wind turbine in the image (e.g., the same image used at block 502). Again, as discussed above, the ML inference service can use any suitable image recognition or computer vision technique to identify the wind turbine shadow in the image. Further, as discussed above, additional metadata can be used to enhance the image recognition (e.g., time and data metadata can be used to calculate an estimated direction of a shadow from a wind turbine based on a calculated location of the sun).

As discussed above, in an embodiment, the ML inference service identifies a wind turbine in an image (e.g., as discussed above in relation to block 502) and a shadow of the wind turbine in the image (e.g., as discussed above in relation to block 504). This is merely one example. Alternatively, or in addition, the ML inference identifies the wind turbine and its shadow together. For example, the shape of the wind turbine and its shadow, combined, may be more distinctive than each shape separately, and it may beneficial for the ML inference service to identify the combined shape of the wind turbine and its shadow.

As another alternative, the ML inference service identifies the location where the wind turbine tower meets the ground based on identifying a tower object (e.g., the wind turbine tower or its shadow) and a turbine object (e.g., additional wind turbine components). For example, the ML inference service can identify the wind turbine tower and additional wind turbine components (e.g., nacelle, rotor) instead of, or in addition to, the wind turbine shadow. The ML inference service can identify where the wind turbine tower meets the ground, in an image, by identifying the end of the wind turbine tower that is opposite to the nacelle or rotor. For example, the end of the wind turbine tower closest to the nacelle and rotor can be assumed to be the top of the wind turbine tower (i.e., the end furthest from the ground), while the end of the wind turbine tower further from the nacelle and rotor can be assumed to be the bottom of the wind turbine tower (i.e., the end that meets the ground). The ML inference service can identify the location where the wind turbine tower meets the ground by identifying the bottom end of the wind turbine tower (i.e., the end further from the nacelle and rotor).

In an embodiment, the ML inference service can further use the wind turbine tower shadow in place of, or in addition to, the wind turbine tower itself. For example, the ML inference service can identify a wind turbine tower shadow, and a shadow of other wind turbine components (e.g., a shadow of a nacelle or rotor). The ML inference service can identify the end of the shadow furthest from the other components (e.g., furthest from the shadow of the nacelle or rotor), can assume that bottom end of the shadow relates to the bottom end of the wind turbine, and can identify the location where the wind turbine meets the ground based on the bottom end of the shadow. Further, the ML inference service can use both the intersection of the wind turbine and its shadow, and the other wind turbine components, to identify the geographic location of the wind turbine.

At block 506, the ML inference service determines whether both a wind turbine, and its shadow, are found in the image. As discussed above this is merely one example, and the ML inference service can identify the wind turbine and its shadow together, or can identify the wind turbine without its shadow. If yes, the flow proceeds to block 508. As discussed above, in an embodiment, the ML inference service performs some tasks using an ML model (e.g., the ML model 216 illustrated in FIG. 2) and performs additional analysis and processing without using an ML model. In one example, the ML inference service uses an ML model for image recognition in blocks 502 and 504, and does not use an ML model for additional analysis in blocks 506-514. This is merely one example. Alternatively, the ML inference service performs all of blocks 502-516 using an ML model, or any combination of blocks 502-516 using an ML model. As another example, the ML inference service performs blocks 502 and 504, and another suitable service performs blocks 506-516.

At block 508, the ML inference service determines the geographic location of the intersection of the wind turbine and the ground. In an embodiment, the ML inference service determines a pixel in the image depicting the intersection of the identified turbine (e.g., identified at block 502) and the identified shadow (e.g., identified at block 504), and uses this to identify the location where the wind turbine meets the ground (e.g., by distinguishing the bottom of the wind turbine tower from the top of the wind turbine tower). The ML inference service then converts this image pixel location to a physical geographic location (e.g., a latitude and longitude). This is merely one example, and the ML inference service can use any suitable technique to identify the location where the wind turbine meets the ground. For example, the ML inference service can identify the location by calculating a vector intersection using the image. The ML inference service can, for example, represent the wind turbine and its shadow as respective vectors (e.g., defined using geographic locations). The ML inference service can then compute the geographic location of the wind turbine by calculating the intersection of the vectors (e.g., without identifying a particular pixel).

As another example, as discussed above, the ML inference service can identify the wind turbine and its shadow together. Further, the ML inference service can distinguish the bottom of the wind turbine tower from the top of the wind turbine tower based on identifying objects in addition to, or instead of, the shadow of the wind turbine tower. For example, the ML inference service can identify the wind turbine tower end furthest from other wind turbine components (e.g., a nacelle or rotor), or can identify the wind turbine tower shadow end furthest from the shadow of other wind turbine components (e.g., a shadow of a nacelle or rotor). This end can be identified as the bottom of the wind turbine tower, and distinguished from the top of the wind turbine tower. Further, in an embodiment, the ML inference service can use both the intersection of the wind turbine tower and its shadow, and the additional identified wind turbine objects, to distinguish the bottom of the wind turbine tower from the top of the wind turbine tower and identify the location in the image where the wind turbine tower meets the ground.

In an embodiment, the ML inference service uses metadata associated with the image (e.g., the metadata 158 illustrated in FIG. 1B) to determine the physical geographic location. For example, the image can include metadata identifying one or more of the geographic location of the center of the image, the geographic area covered by the image, and the size of the image (e.g., in pixels). If the ML inference service determines that the intersection of the turbine and its shadow is at the center of the image, then the ML inference service uses the geographic location of the center of the image, identified in the image metadata, as the location of the wind turbine.

Alternatively, if the ML inference service determines that the intersection of the turbine and ground is not in the center of the image, the ML inference service uses the metadata to determine the geographic location corresponding to the pixel location in the image. For example, the ML inference service can determine the geographic area covered by each pixel, can determine the distance in pixels from the center of the image to the image location of the intersection of the turbine and its shadow, and can use this to calculate the geographic location of the wind turbine.

This is merely an example, and other suitable techniques can be used to determine the geographic location of the intersection of the turbine and its shadow. For example, images may be assume to all be a given size and covering a given geographic area (e.g., based on the properties of the image repository), so that this information is not included in image metadata. As another example, geographic location information corresponding with a given image could be retrieved from another source (e.g., from the image repository, a lookup table, or any other suitable source) instead of being provided as metadata with the image. As another example, the image metadata could designate the geographic location of a portion of the image other than its center (e.g., a corner).

At block 510, the ML inference service updates the location of the wind turbine in a database. In one embodiment, an existing database includes an entry precisely corresponding to the identified location. This indicates that the database accurately included the wind turbine location. The ML inference service can, in an embodiment, update this entry by modifying the database (e.g., marking a flag in a database table indicating that the location has been updated), or can take no further action.

Alternatively, an existing database may not include an entry precisely corresponding to the identified location. In an embodiment, the ML inference service can identify the entry in the database that records a location that is closest in proximity to the identified location. The ML inference service can then modify the entry to record the accurate identified location.

In an embodiment, the ML inference service can use a threshold to determine whether to modify the entry. For example, the entry may have been intended to record a location for the identified wind turbine, but may be inaccurate. In this scenario, the location recorded in the entry should be modified.

The entry may, however, have been intended to record a location for a different wind turbine. In this scenario, the entry should not be modified. To avoid incorrectly modifying an entry intended to refer to a different wind turbine, the ML inference service can modify the entry only where the identified location is sufficiently close in proximity to the recorded location in the database (e.g., within a threshold). Where the identified location is not sufficiently close in proximity to a recorded location, the ML inference service can, in an embodiment, add a new entry to the database recording the location of the newly identified wind turbine.

Returning to block 506, if a wind turbine and its shadow are not found in the image, the flow proceeds to block 512. In an embodiment, this can be assumed to reflect a scenario where an estimated location for a wind turbine (e.g., used to retrieve the image being analyzed) is sufficiently incorrect that the wind turbine does not appear in the image. In an embodiment, the ML inference service can expand the search area to identify the wind turbine location intended to correspond with the image being analyzed.

At block 512, the ML inference service determines an expanded search area. In an embodiment, this can be configured manually, or determined automatically. For example, an administrator can manually configure the parameters for the expanded search area (e.g., the expanded distance to be covered). Alternatively, the expanded search area can be determined automatically. For example, the ML inference service can use the image size to determine the parameters for the expanded search area. If the image under analysis covers only a small area, then the ML inference service can expand the search area by a relatively small amount. If the image under analysis covers a large area, then a larger search area may be needed and the ML inference service can expand the search area by a larger amount.

At block 514, the ML inference service retrieves images for the expanded search area. For example, the ML inference service can request from an image repository a number of images depicting the area surrounding the image under analysis. These additional images can then be searched for a wind turbine and its shadow.

At block 516, the ML inference service determines the location of the wind turbine using images of the expanded search area. For example, the ML inference service can use the image recognition techniques discussed above in relation to block 502 and 504 to identify a wind turbine and its shadow in each image of the expanded search area. If the ML inference service finds both a turbine and its shadow in an image, the techniques discussed above in relation to blocks 508 and 510 can be used determine the geographic location of the turbine and update that location in the database of wind turbine locations.

If the ML inference service does not find both a turbine and its shadow, the flow proceeds to the next image. In an embodiment, the ML inference service can be configured to continue to expand the search area until it finds an image depicting a wind turbine. Alternatively, the ML inference service can be configured to expand the search area only a limited number of times (e.g., one, or zero). This value can be configured by a user, or set automatically (e.g., based on the image size, number of images, etc.).

The techniques described above are merely an example of suitable techniques to identify a location of a wind turbine using ML. Other suitable techniques can be used. For example, the ML inference service could be used to estimate a height of a wind turbine from an image. In an embodiment, image metadata can include the position of the image capture device when the image was taken (e.g., the satellite position when a satellite image is taken). This can be used, along with the image recognition techniques discussed above, to estimate the height of a wind turbine depicted in a given image. The height can be recorded in database.

Further, the height can be used to distinguish between wind turbines and improve the accuracy of the wind turbine location database. For example, assume an existing database entry records a location for an 80 m tall wind turbine. If the ML inference service detects the location of a 140 m tall turbine, the ML inference service can assume that the detected turbine does not correspond to the recorded turbine and can avoid replacing the existing entry with the new location (e.g., adding a new entry instead).

As another example, the ML inference service can detect rotor diameter for a wind turbine. In an embodiment, a wind turbine includes a vertical tower and a rotor that rotates to generate power. The ML inference service could detect a rotor in an image, and could use the rotor image to estimate the rotor diameter. Further, the ML inference service could detect a rotor shadow in an image (e.g., in addition to the tower shadow), and could use the rotor shadow size and shape to estimate the rotor diameter. Further, the ML inference service could use image metadata (e.g., time and date when the image was captured) to estimate the rotor diameter. The ML inference service could further use an image of the rotor itself to improve the estimate, where the rotor is stationary or otherwise visible in the image.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure.

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present disclosure.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:

receiving an image depicting a wind turbine in a geographic area;

identifying, in the image, at least one of a tower of the wind turbine or a shadow of the tower;

identifying, in the image, a component of the wind turbine; and determining, based on the component of the wind turbine and at least one of the tower or the shadow, a bottom end of the wind turbine and a top end of the wind turbine;

determining, based on the bottom end, a pixel of the image that shows where the wind turbine meets ground;

determining, based on a position of the pixel in the image, a geographic location where the wind turbine meets ground; and updating a location of the wind turbine in a database to be the geographic location.

2. The method of claim 1, wherein:

at least one of the tower or the shadow in the image is identified using a machine learning (ML) model; and determining the geographic location comprises distinguishing the bottom end from the top end based on: a position of a pixel in the image showing the tower intersecting the shadow.

3. The method of claim 2, wherein the ML model is trained using data from the database.

4. The method of claim 2, further comprising:

receiving a second image depicting a second geographic area;

failing to recognize a second wind turbine tower using the ML model;

retrieving a third image depicting a third geographic area relating to the second geographic area;

identifying, using the ML model and based on the third image, a second image location, in the third image, relating to a second place where the second wind turbine tower depicted in the third image meets ground depicted in the third image;

determining, based on the third image and the second image location, a second geographic location corresponding to the second image location; and updating a second location of the second wind turbine tower in the database, based on the determined second geographic location.

5. The method of claim 1, wherein:

at least one of the tower or the shadow in the image is identified using an ML model;

identifying the component in the image uses the ML model, the component comprising at least one of: (i) a rotor of the wind turbine, (ii) a nacelle of the wind turbine, (iii) a shadow of the rotor, or (iv) a shadow of the nacelle; and determining the geographic location comprises distinguishing the bottom end from the top end based on an end of the tower or the shadow that is further from the component than an opposite end of the tower or the shadow.

6. The method of claim 1, wherein:

the tower in the image is identified using an ML model;

the shadow in the image is identified using the ML model;

the component in the image is identified using the ML model, the component comprising at least one of: (i) a rotor of the wind turbine, (ii) a nacelle of the wind turbine, (iii) a shadow of the rotor, or (iv) a shadow of the nacelle; and determining the geographic location comprises distinguishing the bottom end from the top end based on:

a position of a pixel in the image showing the tower intersecting the shadow, and an end of the tower or shadow that is further from the component than an opposite end of the tower or shadow.

7. The method of claim 1, wherein the determined geographic location comprises at least one of: (i) a latitude and a longitude, or (ii) easting and northing for a projection.

8. The method of claim 1, wherein determining the geographic location is further based on metadata for the image relating to the geographic area depicted in the image.

9. The method of claim 1, wherein updating the location of the wind turbine tower in the database comprises:

determining that the database does not include an entry recording the determined geographic location;

identifying a first entry in the database based on proximity of a location recorded in the first entry to the determined geographic location; and updating the first entry to record the determined geographic location.

10. The method of claim 9, wherein identifying the first entry in the database is based on the location recorded by the first entry being geographically closest to the determined geographic location relative to other entries in the database.

11. A system, comprising:

a processor; and a memory storing a program, which, when executed on the processor, performs an operation, the operation comprising:

receiving an image depicting a wind turbine in a geographic area;

identifying, in the image, at least one of a tower of the wind turbine or a shadow of the tower;

identifying, in the image, a component of the wind turbine; and determining, based on the component of the wind turbine and at least one of the tower or the shadow, a bottom end of the wind turbine and a top end of the wind turbine;

determining, based on the bottom end, a pixel of the image that shows where the wind turbine meets ground;

determining, based on a position of the pixel in the image, a geographic location where the wind turbine meets the ground; and updating a location of the wind turbine in a database to be the geographic location.

12. The system of claim 11, wherein:

at least one of the tower or the shadow in the image is identified using a ML model; and determining the geographic location comprises distinguishing the bottom end from the top end of the wind turbine tower based on a position of a pixel in the image showing the tower intersecting the shadow.

13. The system of claim 12, the operation further comprising:

receiving a second image depicting a second geographic area;

failing to recognize a second wind turbine tower and a second shadow of the second wind turbine tower, using the ML model;

retrieving a third image depicting a third geographic area relating to the second geographic area;

identifying, using the ML model and based on the third image, a second image location, in the third image, relating to a second place where the second wind turbine tower depicted in the third image meets ground depicted in the third image;

determining, based on the third image and the second image location, a second geographic location corresponding to the second image location; and updating a second location of the second wind turbine tower in the database, based on the determined second geographic location.

14. The system of claim 11, wherein updating the location of the wind turbine tower in the database comprises:

determining that the database does not include an entry recording the determined geographic location;

identifying a first entry in the database that records a location geographically closest to the determined geographic location relative to other entries in the database; and modifying the first entry to record the determined geographic location.

15. A computer program product, comprising:

a non-transitory computer-readable storage medium having computer-readable program code embodied therewith, the computer-readable program code executable by one or more computer processors to perform an operation, the operation comprising:

receiving an image depicting a wind turbine in a geographic area;

identifying, in the image, at least one of a tower of the wind turbine or a shadow of the tower;

identifying, in the image, a component of the wind turbine; and determining, based on the component of the wind turbine and at least one of the tower or the shadow, a bottom end of the wind turbine and tower from a top end of the wind turbine;

determining, based on the bottom end, a pixel of the image that shows where the wind turbine meets ground;

determining, based on a position of the pixel in the image, a geographic location where the wind turbine meets the ground; and updating a location of the wind turbine in a database to be the geographic location.

\* \* \* \* \*